United States Patent
Wolf

(10) Patent No.: US 8,196,405 B2
(45) Date of Patent: Jun. 12, 2012

(54) ENERGY STORAGE SYSTEM AND METHOD FOR STORING AND SUPPLYING ENERGY

(75) Inventor: Erik Wolf, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 330 days.

(21) Appl. No.: 12/489,681

(22) Filed: Jun. 23, 2009

(65) Prior Publication Data

US 2009/0322090 A1    Dec. 31, 2009

(30) Foreign Application Priority Data

Jun. 25, 2008    (EP) .................................... 08011545

(51) Int. Cl.
*F01K 25/08* (2006.01)
*F01K 25/06* (2006.01)

(52) U.S. Cl. ................. 60/651; 60/649; 60/655; 60/671

(58) Field of Classification Search ................. 60/39.01, 60/39.5, 645, 649, 651, 671, 655
See application file for complete search history.

(56) References Cited

U.S. PATENT DOCUMENTS

| | | | | |
|---|---|---|---|---|
| 4,175,381 A | * | 11/1979 | Scragg et al. | 60/39.12 |
| 6,314,732 B1 | * | 11/2001 | Lookholder | 60/597 |
| 6,610,193 B2 | * | 8/2003 | Schmitman | 205/628 |
| 7,188,478 B2 | * | 3/2007 | Bourgeois | 60/772 |
| 7,381,313 B2 | * | 6/2008 | Libby et al. | 204/239 |
| 2005/0279095 A1 | | 12/2005 | Goldman | |
| 2008/0047502 A1 | | 2/2008 | Morse | |

FOREIGN PATENT DOCUMENTS

DE    10055973 A1    5/2002

* cited by examiner

*Primary Examiner* — Hoang Nguyen

(57) ABSTRACT

An energy storage system is provided which includes an electrolyser a hydrogen gas storage and a power plant. The electrolyser is connected to the hydrogen gas storage and the hydrogen gas storage is connected to the power plant. Furthermore, a method for storing and supplying energy is provided which includes delivering electrical energy to an electrolyser; decomposing water into oxygen and hydrogen gas by means of the electrolyser; storing the hydrogen gas; supplying the stored hydrogen gas to a power plant; and producing electrical energy via of the power plant.

17 Claims, 2 Drawing Sheets

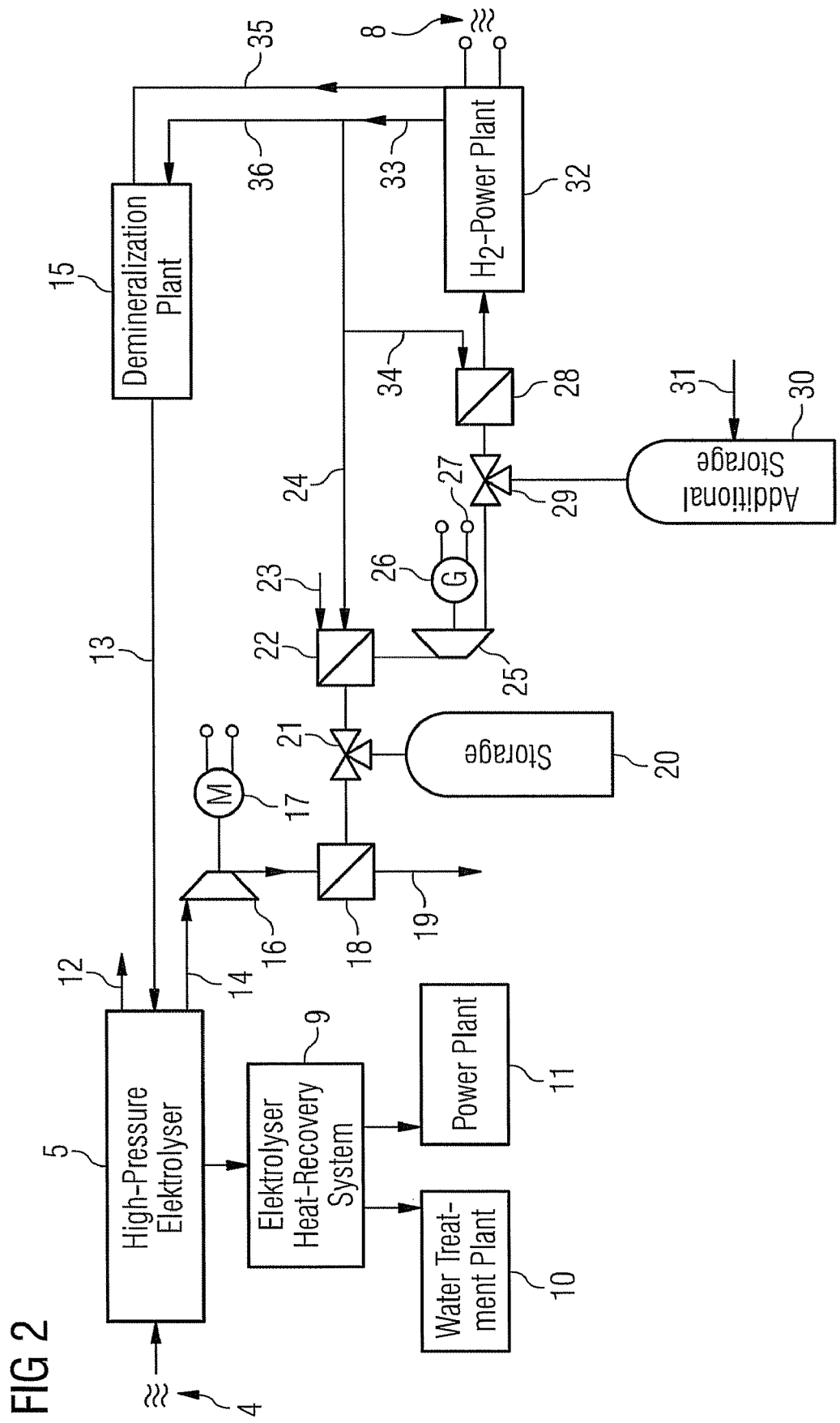

ENERGY STORAGE SYSTEM AND METHOD FOR STORING AND SUPPLYING ENERGY

CROSS REFERENCE TO RELATED APPLICATIONS

This application claims priority of European Patent Office application No. 08011545.4 EP filed Jun. 25, 2008, which is incorporated by reference herein in its entirety.

FIELD OF INVENTION

The present invention relates to an energy storage system and to a method for storing and supplying energy.

BACKGROUND OF INVENTION

Renewable energy is the choice of today to reduce $CO_2$ emissions and to reduce the reliance on other primary energy sources. Renewable energy can replace a significant amount of the existing conventional power plants. The drawback of this source is that it is not always available with the needed power output and that it has a limited controllability.

SUMMARY OF INVENTION

The feed in of renewable energy depends also on the availability of the source itself and of the remaining capacity of the grid. To reach the ultimate goal of the society to reduce the $CO_2$ emissions and to become independent of fossil fuels the contributions of renewable energy needs to be maximized. This means that it is necessary to deal with fluctuation and stochastic energy sources. In order to achieve that, an overcapacity of renewable energy generation will be necessary. Access in supply will be stored to be used timely decoupled. When supply does not match the demand the energy can be generated by discharging the storage.

There are many different ways to store electrical energy. Electrical energy can be stored electro-chemically in batteries, physically, for example in form of pressure or potential energy. Potential energy is especially stored in a pumped hydro storage or in a compressed air energy storage (CAES).

Pumped hydro storage systems can be used to store access energy. Access in electrical energy may be used to pump water to a storage at a higher elevation. The stored potential energy of the water can later be used for electrical power generation in a water turbine. The CAES uses the compression energy of compressed air in an expansion process. Based on the CAES type natural gas is needed to compensate the thermal losses of the compression process.

Water and compressed air do not have a high specific power density and therefore the energy capacity of such systems is very limited.

Therefore, it is a first objective of the present invention to provide an advantageous energy storage system. It is a second objective of the present invention to provide an advantageous method for storing and supplying energy.

The first objective is solved by an energy storage system and the second objective is solved by a method for storing and supplying energy as claimed in the independent claims. The depending claims define further developments of the invention.

The inventive energy storage system comprises an electrolyser, a hydrogen gas storage and a power plant. The electrolyser is connected to the hydrogen gas storage. The hydrogen gas storage is connected to the power plant. Advantageously the electrolyser is a high pressure electrolyser.

With the inventive energy storage system the drawbacks of known energy storage systems are eliminated. In particular, instead of using a storage medium of low specific energy density a high energy density medium, i.e. hydrogen and preferably compressed hydrogen, is used. This allows designing for a very compact high power and high capacity storage. The inventive energy storage system provides a reliable energy supply in spite of a source that feeds in stochastically and indeterminably.

Due to the very high energy density of the suggested storage systems it can operate for many days at full load but also it can be used on a daily schedule during peak demand times. That is an important difference to a pumped hydro storage which can operate some hours only or of the compressed air energy storage system (CAES) which also operates some hours in maximum.

Moreover, the present invention offers up to 100 times of the energy capacity of conventional storage systems for electrical energy. Generally, the energy which needs to be stored is in 100s of GWh.

Preferably the inventive energy storage system comprises a hydrogen compressor which is connected to the electrolyser and to the hydrogen gas storage. For example, the hydrogen gas storage can be an underground storage. The hydrogen coming from the electrolyser can be compressed by means of the hydrogen compressor before it is stored in the hydrogen gas storage.

Moreover, the inventive energy storage system may comprise a heat recovering system which may be connected to the hydrogen compressor and/or to a power plant and/or to a water treatment plant. The heat recovery system can be used to recover the heat of the compression worked applied to the hydrogen to further compress the hydrogen for storage, for example in an underground storage. The hydrogen can be further compressed by means of a hydrogen compressor which raises the pressure after the electrolyser further until it reaches the pressure of the storage.

Furthermore, the inventive energy storage system may comprise at least one storage cavity. For example, the hydrogen gas storage and/or the storage cavity can be an underground hydrogen storage for hydrogen at high pressure.

The inventive energy storage system can comprise an electrical energy delivery unit which may be connected to the electrolyser. Furthermore, the inventive energy storage system can comprise an electrical energy supply unit which can be connected to the power plant. The inventive energy storage system can further comprise grid connections to import power during charge and export power during discharge. The electrical energy delivery unit can be connected to the electrolyser by means of a grid. The power plant can be connected to the electrical energy supply unit by means of a grid.

The inventive energy storage system can further comprise a water treatment plant which is connected to the electrolyser to provide demineralised water to the electrolyser. Moreover, it can comprise an electrolyser heat-recovery system. This electrolyser heat-recovery system can recover heat from the electrolyser. The recovered heat can be used in the water treatment plant and/or in a power plant. This means that the electrolyser heat-recovery system can be connected to the power plant and/or to the water treatment plant.

Moreover, the inventive energy storage system may comprise at least one additional gas storage. This additional gas storage can be a gas storage for oxygen or for natural gas or other gas to blend the hydrogen before combustion in case this is preferable over using pure hydrogen.

Furthermore, the inventive energy storage system can comprise a fuel supply system and/or a hydrogen pre-heater. The hydrogen pre-heater can especially be used to pre-heat the hydrogen before expanding it to a fuel supply system pressure to improve the cycle efficiency. Furthermore, the inventive energy storage system may comprise a gas mixing station, especially a fuel mixing station. The gas mixing station can be used to set the fuel gas properties accordingly to the power plants requirement. The inventive energy storage system can further comprise a fuel gas pre-heater. The fuel gas pre-heater can be located before or behind the gas mixing station.

The inventive energy storage system can especially comprise a hydrogen expander or a turbine with a generator producing electrical energy. The expander (25) or the turbine may be connected to the hydrogen gas storage, for instance through a pre-heater and/or a control valve. The expander or the turbine can further be connected through a control valve to a gas mixing station or to a fuel gas pre-heater. The gas mixing station comprises an additional gas storage, for example for oxygen, natural gas or other gas for blending the hydrogen.

Furthermore, the inventive energy storage systems may comprise a gas expander. The gas expander can be used to recover the compression energy applied to the hydrogen to improve the cycle efficiency.

The power plant may preferably comprise a combination of a turbine and a generator. It can especially comprise a conventional power plant for reconversion of chemical energy, for example of hydrogen, to electrical energy.

The energy storage system can also comprise a heat recovery system which is connected to a water demineralisation plant. The water demineralisation plant can preferably be connected to the electrolyser. This improves the cycle efficiency, because the heat recovery system may provide thermal heat for the water demineralisation plant applied to the electrolyser.

Additionally, the inventive energy storage system may comprise a power import control system and/or a power export control system. It can also comprise a control system which controls the power export and import. The inventive energy storage system may also comprise a controllable grid interface for charge and/or discharge.

Furthermore, the energy storage system can comprise an interface to export hydrogen and/or oxygen outside of the hydrogen gas storage. Advantageously, the energy storage system can comprise a chemical process plant. The chemical process plant can comprise an oxygen inlet which may be connected an oxygen outlet of the electrolyser. The chemical process plant can utilize the by-product oxygen for chemical processes like biomass to products.

Generally, the inventive energy storage system solves the inherent problem of the low energy density and small power capacity of existing storage solutions. In an optimized setup in conjunction with renewable energy it can offer sufficient capacity to bridge low to high power generation of the renewable energy for many days. A fully sustainable energy supply based on renewable energy can be realized by the inventive system.

The inventive method for storing and supplying energy comprises the steps of: delivering electrical energy to an electrolyser; decomposing water into oxygen and hydrogen gas by means of the electrolyser; storing the hydrogen gas; supplying the stored hydrogen gas to a power plant; and producing electrical energy by means of the power plant.

Preferably a high pressure electrolyser can be used. Advantageously demineralised water can be provided to the electrolyser. Furthermore heat from electrolyser can be recovered. The recovered heat can be used in a water treatment plant and/or in a power plant.

Preferably the hydrogen gas may be compressed before it is stored. This increases the specific energy density and thus the storage capacity. The heat of the compression work can be recovered. The compression energy applied to the hydrogen can especially be recovered by means of a gas expander.

The hydrogen can be pre-heated and/or expanded before it may be supplied to the power plant. Preferably the power plant may comprise a turbine and a generator. Furthermore, heat from the power plant can be recovered. The heat from the power plant can especially be conducted to a water demineralisation plant which may be applied to the electrolyser.

Moreover, the hydrogen can be mixed with natural gas and/or a diluent.

Furthermore, oxygen from the electrolyser may be conducted to a chemical process plant. The chemical process plant may utilize the by-product oxygen for chemical process like, for example, biomass to products.

Generally, the inventive method has advantages as the inventive energy storage system has.

The present invention provides a large scale energy storage system which can store very large quantities of energy. Compared to existing storage systems the amount is between factors of 10-100 larger. In conjunction with a renewable energy source, for example a big wind power plant, it could provide sufficient capacity and power output that the two systems will appear to the grid operator like a conventional power plant with its high availability and dispatchability.

Large energy storage systems will avoid to turn down or even to shut-off renewable energy generation in case of low demand as it happens when generation management needs to be applied. The introduction of a high pressure electrolyser improves significantly the system efficiency and power density in contrast to systems which would not use one. Furthermore, the heat recovery loops at the high pressure hydrogen compressor, at the high pressure hydrogen expander and at the fuel gas pre-heating increase the efficiency of the storage.

BRIEF DESCRIPTION OF THE DRAWINGS

Further features, properties and advantages of the present invention will become clear from the following description of embodiments in conjunction with the accompanying drawings. The described features are advantages alone and in combination with each other.

FIG. 2 schematically shows a more detailed embodiment of an inventive energy storage system.

DETAILED DESCRIPTION OF INVENTION

Figure 1:
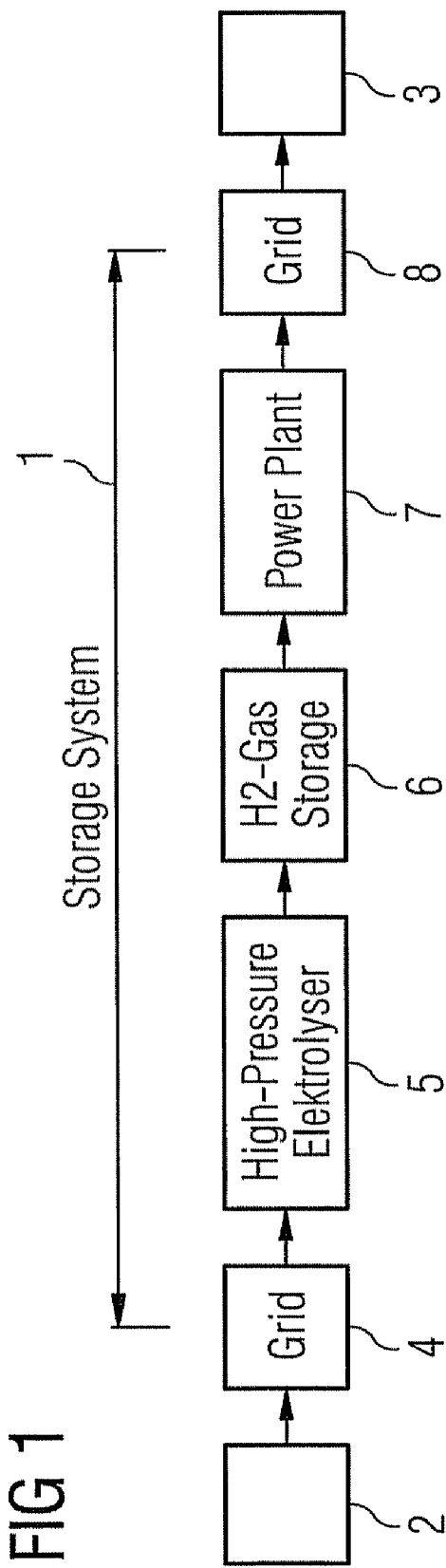
FIG. 1 schematically shows an inventive energy storage system.

A first embodiment of the present invention will now be described with reference to FIG. 1. FIG. 1 schematically shows an inventive energy storage system 1, which comprises a high-pressure electrolyser 5, a hydrogen gas storage 6, a power plant 7 and grid connections 4, 8. Electrical energy, for example renewable energy, coming from an electrical energy delivery unit 2 is delivered to the high pressure electrolyser 5 by means of a grid 4. In the high pressure electrolyser 5 hydrogen is separated from water by means of electrolysis. The hydrogen is then stored in the hydrogen gas storage 6. When needed, the stored hydrogen is supplied to the power plant 7. The electrical energy produced by the power plant 7 is then supplied to a grid 8.

A second embodiment of the present invention will now be described with reference to FIG. 2. FIG. 2 schematically shows an example for a detailed embodiment of the inventive energy storage system 1.

FIG. 2 shows a high pressure electrolyser 5 which is delivered with electrical energy by means of a grid 4. Water 13 coming from a demineralisation plant 15 is guided to the high-pressure electrolyser 5. In the high pressure electrolyser 5 the water 13 is decomposed into oxygen 12 and hydrogen 14. The high-pressure electrolyser 5 is further connected to an electrolyser heat-recovery system 9. The heat which is recovered by means of the electrolyser heat-recovery system 9 can be used for a water treatment plant 10 and/or for a power plant 11, for example. The water treatment plant 10 can especially be part of the demineralisation plant 15 which demineralises the water 13 for the high-pressure electrolyser 5.

The separated hydrogen from the high-pressure electrolyser 5 is guided to a hydrogen compressor 16. The hydrogen compressor 16 can be driven by a motor 17.

The compressed hydrogen is then let to a heat exchanger 18 where it is cooled. The compressed and cooled hydrogen is then guided to a hydrogen storage 20. Between the heat exchanger 18 and the hydrogen storage 20 a control valve 21 is located. The heat from the heat exchanger 18 can, for example, be stored in a thermal storage or can be used in a demineralisation plant, for instance in the demineralisation plant 15. The heat flow away from the heat exchanger 18 is indicated by an arrow 19.

If the hydrogen which is stored in the hydrogen storage 20 is needed it can be guided via the control valve 21 to a pre-heater 22 where it is pre-heated. The thermal energy which is needed for pre-heating the hydrogen in the pre-heater 22 may be taken from a thermal storage. This is indicated by an arrow 23. Alternatively or additionally, the needed heat can be delivered from a power plant 32. This is indicated by arrows 33 and 24.

The pre-heated hydrogen is then guided to a hydrogen expander 25, which may be a turbine. The hydrogen expander 25 or the turbine activates a generator 26 which produces electrical energy. The electrical energy produced by the generator 26 is than supplied to a grid 27.

The hydrogen, which is expanded by means of the hydrogen expander 25, is then guided to a fuel gas pre-heater 28. Before reaching the fuel gas pre-heater 28, the hydrogen can be mixed with natural gas and/or with a diluent. For this purpose an additional gas storage 30 is connected to a pipe between the hydrogen expander 25 and the fuel gas pre-heater 28 via a control valve 29. The additional gas storage 30 can be a gas storage for natural gas or other gas to blend the hydrogen before combustion in case this is preferable over using pure hydrogen. The additional storage 30 can be delivered by an external supply. This is indicated by an arrow 31.

The hydrogen or the mixture of hydrogen with a natural gas and/or the diluent which is pre-heated by means of the fuel gas pre-heater 28 is then led to a power plant 32. In the power plant 32 electrical energy is generated. The power plant could be a simple cycle power plant (without exhaust heat utilization) or a combined cycle power plant (with exhaust heat utilization in a toping cycle, e.g. steam cycle) for highest efficiency. The produced electrical energy is supplied to a grid 8. The waste heat from the power plant 32 can be used for the pre-heater 22 and/or for the fuel gas pre-heater 28. This is indicated by arrows 33, 24 and 34. Furthermore, the heat from the power plant can be used for the demineralisation plant 15. This is indicated by an arrow 36. Water produced during the combustion process can be extracted from the exhaust stream and fed to the demineralisation plant 15 to reduce the water consumption of the storage system. The arrow 35 indicates the water flow from the power plant 32 to the demineralisation plant 15.

The heat recovery loops at the high-pressure hydrogen compressor 16, at the high pressure hydrogen expander 25 and at the fuel gas pre-heater 28 increase the efficiency of the storage. Generally, the described energy storage system and the inventive method for storing and supplying energy, which can be performed by means of the described energy storage system, provides a large scale energy storage which can store very large quantities of energy.

The invention claimed is:

1. An energy storage system, comprising:
    a hydrogen gas storage unit connected to receive compressed hydrogen;
    an electrolyser connected to generate and provide the hydrogen to the hydrogen gas storage unit;
    a gas expander positioned to receive the compressed hydrogen from the storage unit and recover compression energy;
    a generator coupled to produce electrical energy from recovered compression energy;
    a first pre-heater coupled to heat hydrogen received from the storage unit prior to receipt of the hydrogen by the gas expander; and
    a power plant coupled to receive the hydrogen as an expanded fuel gas after recovery of compression energy by the gas expander to generate electric power from the hydrogen.

2. The energy storage system of claim 1, wherein the electrolyser is a high pressure electrolyser which provides compressed hydrogen.

3. The energy storage system as claimed in claim 1, wherein the power plant comprises a combination of a turbine and a generator.

4. The energy storage system as claimed in claim 1, further comprises a hydrogen compressor which is connected to the electrolyser and to the hydrogen gas storage.

5. The energy storage system as claimed in claim 1, further comprises a power import control system and/or a power export control system.

6. The energy storage system as claimed in claim 1, further comprises a gas mixing station.

7. The energy storage system as claimed in claim 1, further comprising a fuel gas pre-heater.

8. The energy storage system as claimed in claim 1, further comprising:
    a first control valve which controls flow of the hydrogen from the storage unit to the pre-heater;
    a second control valve, wherein the expander is further connected through the second control valve to a fuel gas pre-heater.

9. The energy storage system as claimed in claim 7, further comprises:
    a second control valve,
    wherein the gas expander is further connected through the second control valve to a gas mixing station.

10. The energy storage system as claimed in claim 9, wherein the gas mixing station comprises an additional gas storage unit.

11. The energy storage system as claimed in claim 7, further comprising:
    a hydrogen expander with a generator producing electrical energy,
    wherein the expander is connected to the hydrogen gas storage unit through the pre-heater or the first control valve.

12. The energy storage system as claimed in claim 11, further comprising:
   a second control valve,
   wherein the expander is further connected through the second control valve to the fuel gas pre-heater.

13. The energy storage system as claimed in claim 11, further comprising:
   a second control valve,
   wherein the expander is further connected through the second control valve to a gas mixing station.

14. The energy storage system as claimed in claim 13, wherein the gas mixing station comprises an additional gas storage unit.

15. The energy storage system of claim 4, further comprising a heat recovery system connected to the hydrogen compressor and/or to a power plant and/or to a water treatment plant.

16. The energy storage system of claim 1 wherein the first pre-heater receives thermal energy for pre-heating from the power plant.

17. The energy storage system of claim 1 further including a second pre-heater coupled to heat the hydrogen after recovery of compression energy and prior to generation of electrical energy with the hydrogen in the power plant.

* * * * *